(12) United States Patent
Koeppel et al.

(10) Patent No.: US 11,746,954 B2
(45) Date of Patent: Sep. 5, 2023

(54) ASSEMBLY UNIT AS A STRUCTURAL COMPONENT FOR A LUBRICANT PUMP

(71) Applicant: BAIER & KOEPPEL GMBH & CO. KG, Pegnitz (DE)

(72) Inventors: Bernhard Koeppel, Pegnitz (DE); Johannes Wittmann, Pegnitz (DE)

(73) Assignee: GROENEVELD-BEKA GMBH, Pegnitz (DE)

( * ) Notice: Subject to any disclaimer, the term of this patent is extended or adjusted under 35 U.S.C. 154(b) by 407 days.

(21) Appl. No.: 16/743,740

(22) Filed: Jan. 15, 2020

(65) Prior Publication Data

US 2020/0224820 A1    Jul. 16, 2020

(30) Foreign Application Priority Data

Jan. 16, 2019   (EP) .................................... 19152025

(51) Int. Cl.
 *F16N 13/14*   (2006.01)
 *F01M 1/02*    (2006.01)
 *F04B 9/04*    (2006.01)

(52) U.S. Cl.
 CPC .............. *F16N 13/14* (2013.01); *F01M 1/02* (2013.01); *F04B 9/045* (2013.01); *F01M 2001/023* (2013.01); *F01M 2001/0261* (2013.01); *F05B 2260/506* (2013.01)

(58) Field of Classification Search
 CPC .............. F01M 1/02; F01M 2001/023; F01M 2001/0261; F04B 27/0891; F04B 27/0895; F04B 39/14; F04B 9/04; F04B 9/045; F05B 2260/506; F16N 13/10; F16N 13/14
 See application file for complete search history.

(56) References Cited

U.S. PATENT DOCUMENTS

2005/0074354 A1*  4/2005  Ebara ................. F04C 18/3564
                                                417/572
2009/0301887 A1* 12/2009  Saito ...................... C25D 11/04
                                                205/50
2011/0271670 A1* 11/2011  Krebs .................. F04B 45/047
                                                60/533

FOREIGN PATENT DOCUMENTS

| DE | 3221912 A1   | 1/1983  |            |
|----|--------------|---------|------------|
| EP | 0340477 A2   | 11/1989 |            |
| EP | 1514774 A1 * | 3/2005  | F16N 13/10 |
| EP | 1514774 A1   | 3/2005  |            |
| JP | H06280740 A  | 10/1994 |            |
| JP | H10201169 A  | 7/1998  |            |
| JP | 2006145028 A | 6/2006  |            |

OTHER PUBLICATIONS

Machine Translation of EP 1514774A1 PDF file name: "EP1514774A1_Machine_Translation.pdf".*

(Continued)

*Primary Examiner* — Grant Moubry
*Assistant Examiner* — Ruben Picon-Feliciano
(74) *Attorney, Agent, or Firm* — Quarles & Brady LLP

(57) ABSTRACT

An assembly unit as a structural component for a lubricant pump, the assembly unit having a base plate, at least one pump element housing fixedly attached to the base plate with a pump element powered by a linear motion inserted therein, and further having an eccentric fixing to enable assembling an eccentric arrangement provided with a circumferential eccentric in a fixed relative position to the pump element inserted into the pump element housing.

13 Claims, 3 Drawing Sheets

(56) References Cited

OTHER PUBLICATIONS

European Patent Office, Extended Search Report, Application No. 19152025.3, dated Jun. 4, 2019, 6 pages [English Language Translation Unavailable].
Japan Patent Office, Office Action, Application No. 2020-004083, dated Mar. 7, 2023, 9 pages.

* cited by examiner

ASSEMBLY UNIT AS A STRUCTURAL COMPONENT FOR A LUBRICANT PUMP

CROSS-REFERENCE TO RELATED APPLICATIONS

This application claims priority to European Patent Application No. 19152025.3 filed Jan. 16, 2019. The contents of this application are hereby incorporated by reference as if set forth in its entirety herein.

DESCRIPTION

The disclosure relates to an assembly unit as a central structural component for a lubricant pump according to the features of claim 1 as well as a method of manufacturing a structural unit for a lubricant pump according to the features of claim 11.

Lubricant pumps with at least one pump element pressurised by an eccentric arrangement with a circumferential eccentric and delivering lubricant by means of a linear motion of a piston in the pump element are well known in the art. However, such lubricant pumps are usually comparatively complex in structure and often vary depending on the specific field of application and depending on the specific lubrication needs. Lubricant pumps are employed, for example, in construction machinery, agricultural machinery, heavy goods vehicles, in mining systems, in industrial systems, or in wind power systems in order to supply one or more lubrication points with lubricant. Typically, the various components of the lubricant pump are secured relative to a housing usually formed from metal, and forces arising between the eccentric arrangement and the pump element are absorbed via the previously mentioned housing.

The object of the present disclosure based on this state of the art is to propose a different concept for the structure of a lubricant pump.

In terms of apparatus technology, this object is attained by an assembly unit as a structural component for a lubricant pump, the assembly unit having a base plate, at least one pump element housing fixedly attached to the base plate with a pump element powered by a linear motion inserted therein, and further having an eccentric fixing to enable assembling an eccentric arrangement provided with a circumferential eccentric in a fixed relative position to the pump element inserted into the pump element housing. In terms of method technology, the object is attained by a method comprising the steps of:

providing a base plate with a pump element housing fastened thereto or previously integrally formed therewith, and fastening an eccentric arrangement in an eccentric fixing provided on the base plate and preferably formed as a borehole.

Advantageous developments are stated in the dependent claims.

A key consideration of the present disclosure consists in providing a base plate also providing a bearing support for the pump element, wherein this bearing support may also be formed and/or designated as a pump element housing and serves to fasten and/or secure the pump element relative to the base plate. Opposite the base plate and movable within the limits specified by the pump element, there is a lubricant piston comprised by the pump element, executing a linear motion within the pump element and causing the pumping process of the lubricant by means of the pump element.

In a preferred configuration, the lubricant piston is able to reciprocate in a linear manner on an axis parallel to a plane of the base plate. In a preferred configuration, the base plate is formed as a plane-parallel planar base plate of substantially rectangular form.

The base plate of the present disclosure further comprises an eccentric fixing in order to enable fastening the eccentric arrangement provided with a circumferential eccentric such that the circumferential eccentric remains rotationally movable. In a preferred configuration, the rotation axis of the circumferential eccentric of the eccentric arrangement is perpendicular to a plane of the base plate.

The base plate proposed according to the disclosure enables the lubricant pump to be structured in a modular manner outward starting from the central components. Another advantage consists in the fact that forces arising between the circumferential eccentric of the eccentric arrangement and the pump element or elements are absorbed directly and immediately via the base plate, so that no driving forces of the pump element or elements need to be transmitted via any exterior components such as a surrounding housing, if present. This already creates entirely new possibilities regarding the structure and design of a surrounding housing, from the choice of materials and geometric configuration through to savings potential in terms of production technology. For example, plastic components may easily be used, or the surrounding housing may be formed entirely of plastic.

Yet another, and also not in the least unsubstantial, advantage consists in the fact that the spacing of the bearing support of the pump element and/or the pump element housing of the pump element relative to an eccentric fixing and/or relative to a central axis of the eccentric arrangement may be precisely specified—also with the aid of a positioner, if necessary—, and that a tolerance stack-up, as existed conventionally when merging a plurality of individual elements, and as such an overall large variance in spacing between the pump element housing and/or bearing support of the pump element and eccentric axis had to be accepted, no longer exists. In particular, this leads to tolerance independence from the housing. Avoiding the tolerance stack-up according to the state of the art leads to significantly improved precision of delivery.

The technical concept proposed herein of a base plate, which both regarding its topological arrangement and its function may also be referred to as a central base plate, opens up entirely new structural possibilities. The manufacturing effort may be reduced since such assembly units may be pre-assembled in larger numbers. The relative positioning of the pump element and eccentric arrangement may be specified more precisely. The immediate transmission of forces enables considering different shapes of housings, and materials and manufacturing cost may be reduced in this regard as well. Correspondingly, a lubricant pump, comprising an assembly unit according to the disclosure as well as a pump housing with the assembly unit received therein, is also claimed. In an advantageous configuration, it may be provided that the pump housing consists fully or partially of plastic. In particular, a two-part or multi-part plastic housing may be considered in which the assembly unit is fixed in a suitable way.

It is possible to fasten the bearing support and/or the pump element housing to the base plate, for example to solder, to press, to rivet, to screw, to crimp them to the base plate or to connect them to the base plate using any other common joining technology. Alternatively, it is also possible, however, to form the bearing support for the pump element and/or the pump element housing integrally with the base plate. Such arrangements may be realised using a casting method, for example, but particularly via 3D-printing-type additive production methods.

In an advantageous configuration, the eccentric fixing may also comprise a plurality of boreholes, in particular three boreholes, formed to receive fastening bolts in order to enable securing the eccentric arrangement in a fixed relative position to the pump housing via the fastening bolts. The fastening bolts may engage respective internally threaded boreholes of fixed parts of the eccentric arrangement, for example a bearing washer. The walls of the borehole may also be especially tempered, for example hardened, provided with a coating, or a bearing bush may also be inserted into the mentioned borehole.

In a specifically preferred configuration, the assembly unit is previously formed as a unit also previously comprising the eccentric arrangement disposed in a fixed relative position to the pump housing. In one preferred embodiment of the disclosure, the base plate may be formed from metal and may have a thickness of between 1.5 mm and 10 mm.

In a further preferred configuration, the base plate is formed from metal and formed to absorb the maximum compression force $F_{max}$ applied by the eccentric in pump operation such that under the influence of this force $F_{max}$, a change in distance between a central axis of the eccentric arrangement and the pump element in a distal reversal point is less than 100 µm, preferably less than 20 µm. In other words, application of this force $F_{max}$ causes these two reference points to be pushed apart by a maximum of less than 100 µm, preferably less than 20 µm. Since no such immediate transfer of forces between the eccentric arrangement on one hand and the pump element on the other hand existed in the art, but forces were often transmitted via housing parts or intermediate components, a certain degree of stack-up of unfavourable tolerance conditions had to be accepted regarding the tolerances as such. Moreover, the transfer of forces was not immediate in such a way, so that force applications herein led to the pressurised components diverging relative to each other more easily than is the case according to the concept of the present disclosure.

In a preferred configuration, the assembly unit further comprises a driving device connected to the base plate and coupled to the eccentric arrangement in a torque-locked manner. The driving device may, for example, comprise an electric motor or a hydraulic motor coupled to the eccentric arrangement via any suitable gearing or without any gearing. For example, the driving device may comprise an electric motor with its drive shaft coupled to a gear worm engaging a worm wheel on the eccentric arrangement.

In one possible, usually also preferred configuration, the base plate has, especially in the case of only one pump element, a substantially rectangular basic shape, wherein the longer side of the rectangular shape is parallel to a longitudinal extension of the pump element inserted into the pump housing. If several pump elements are disposed side by side in a radial orientation in relation to an axis of the eccentric, a base plate having at least roughly the outline shape of a circular segment, or even defining a circular disk, may also be recommended.

Although providing the assembly unit floating in the lubricant would be conceivable in theory, it is considered a preferred aspect that the pump element housing 12 may cooperate with a lubricant supply from, for example, a lubricant cartridge, and that lubricant is discharged via a lubricant discharge line and/or a lubricant discharge channel, so that the eccentric arrangement is disposed outside the lubricant reservoir. This leads to less dead space in the pump housing. When filling for the first time, this leads to a reduction of lubricant used since conventionally provided dead space does not need to be filled as well. Even in the operating state, the complete lubricant container volume, particularly the complete lubricant cartridge volume, may be used.

The disclosure will be explained in more detail below, also regarding further features and advantages by means of the description of exemplary embodiments with reference to the accompanying drawings. In the drawings.

Figure 1:
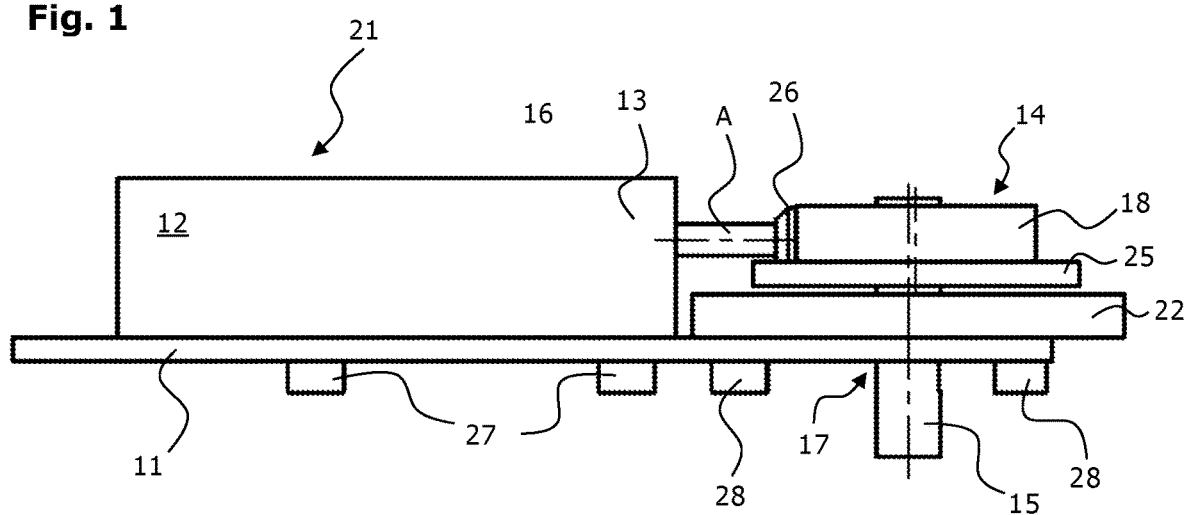
FIG. 1 is a side view of an embodiment of an assembly unit according to the present disclosure.

On a ground plate 11, which is planar in the present embodiment, having a rectangular form and a constant thickness, a bearing is initially formed in order to provide bearing support to a pump element 13. The bearing for the pump element 13 is herein specifically formed as a pump element housing 12. Within the pump element housing 12, the pump element 13 is held free of clearance. Within the base plate 11, an eccentric fixing 17 is further provided, which herein is specifically formed as a borehole in which a drive shaft 15 of an eccentric arrangement 14 is rotationally supported.

In the present embodiment, the eccentric arrangement 14 has the previously mentioned drive shaft as well as an eccentric 18 coupled to the drive shaft 15 in a rotationally fixed manner. The eccentric 18 may slidably rest on a bearing washer 22 stationary relative to the base plate 11, and may comprise an eccentric body 23 as well as an eccentric washer 25 formed with an undercut 24.

A transmission means 16, formed herein as a piston, transmits the tensile and compression forces of the eccentric 18 to the pump element 13 accommodated in the pump element housing 12. To this end, the transmission means 16 formed as a piston has an end-face portion 26 abutting, on one hand, the external surface of the eccentric 18 and engaging, on the other hand, the undercut 24 of the eccentric washer 25. As a result, tensile and compression forces of the eccentric arrangement 14 may be transmitted to the transmission means 16 formed as a piston, and the transmission means may be caused to reciprocate in a linear manner upon revolution of the eccentric 18. This linear reciprocation is transmitted to a piston of the pump element via the transmission means 16. The transmission means 16 may, however, also be an integral part of the piston of the pump element. The longitudinal extension of the transmission means 16 formed as a piston is perpendicular to an axis A defined by the drive shaft 15 and, at the same time, parallel to the plane of the base plate 11.

Figure 2:
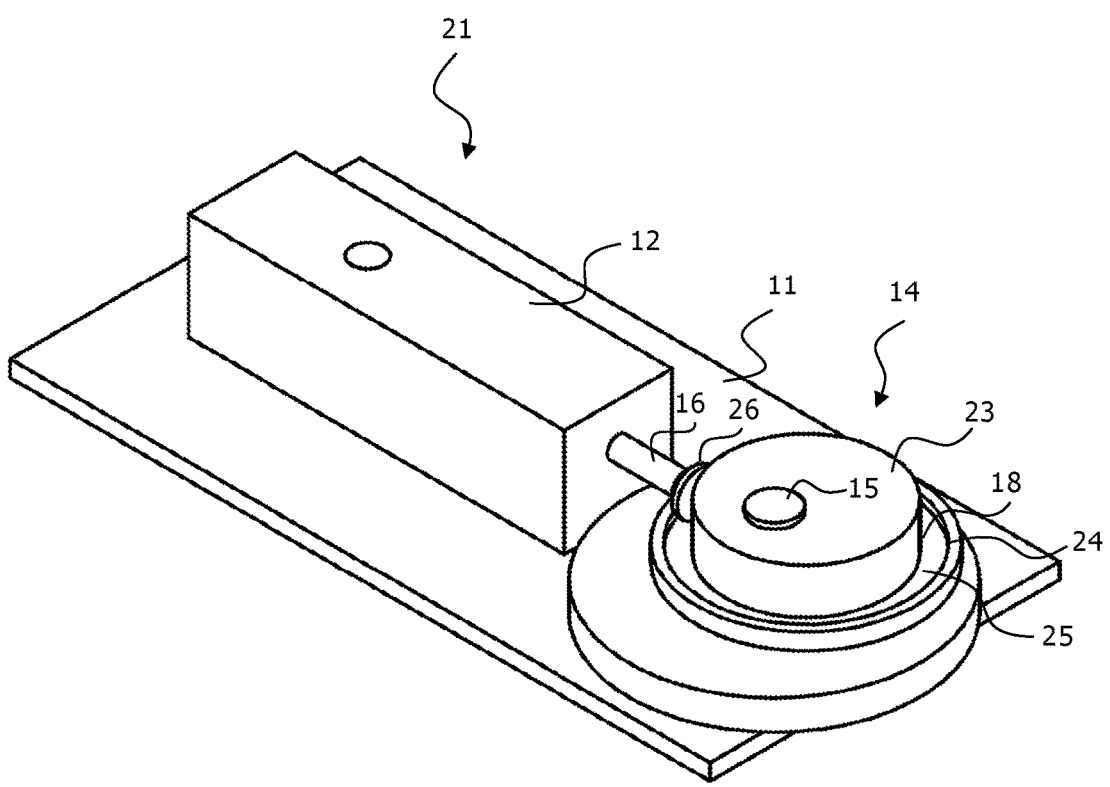
FIG. 2 is the assembly unit of FIG. 1 in a top view.
Figure 3:
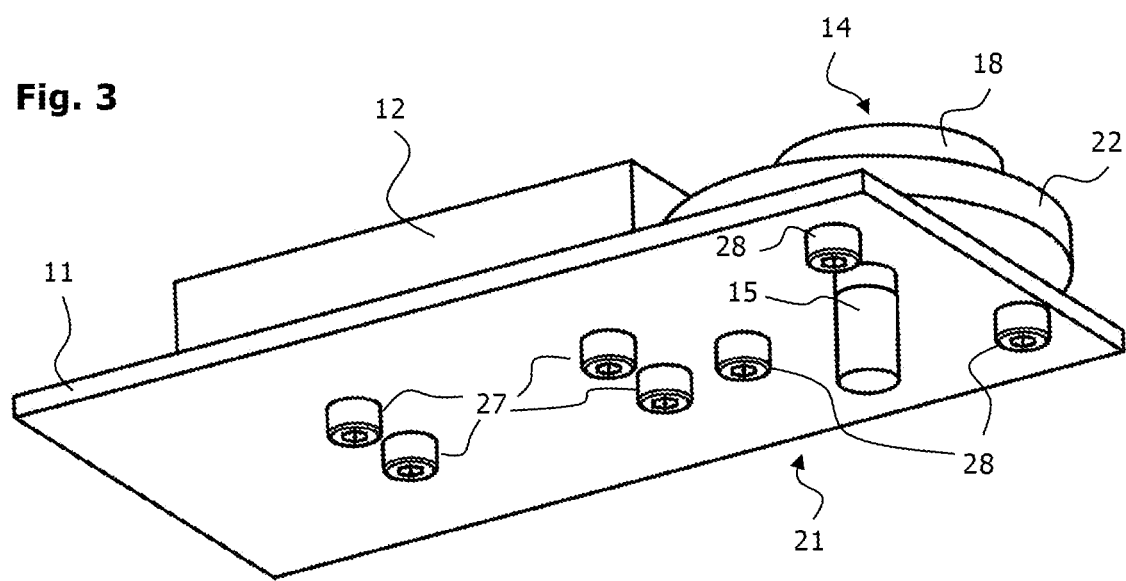
FIG. 3 is the assembly unit of FIG. 1 in a view at an angle from below.

Both the pump element housing 12 and the bearing washer 22 of the eccentric arrangement 14 may be fixed to the base plate 11 via fastening bolts 27, 28. FIGS. 2 and 3 depict the embodiment previously described by means of FIG. 1 at an angle from above and at an angle from below, respectively.

Figure 4:
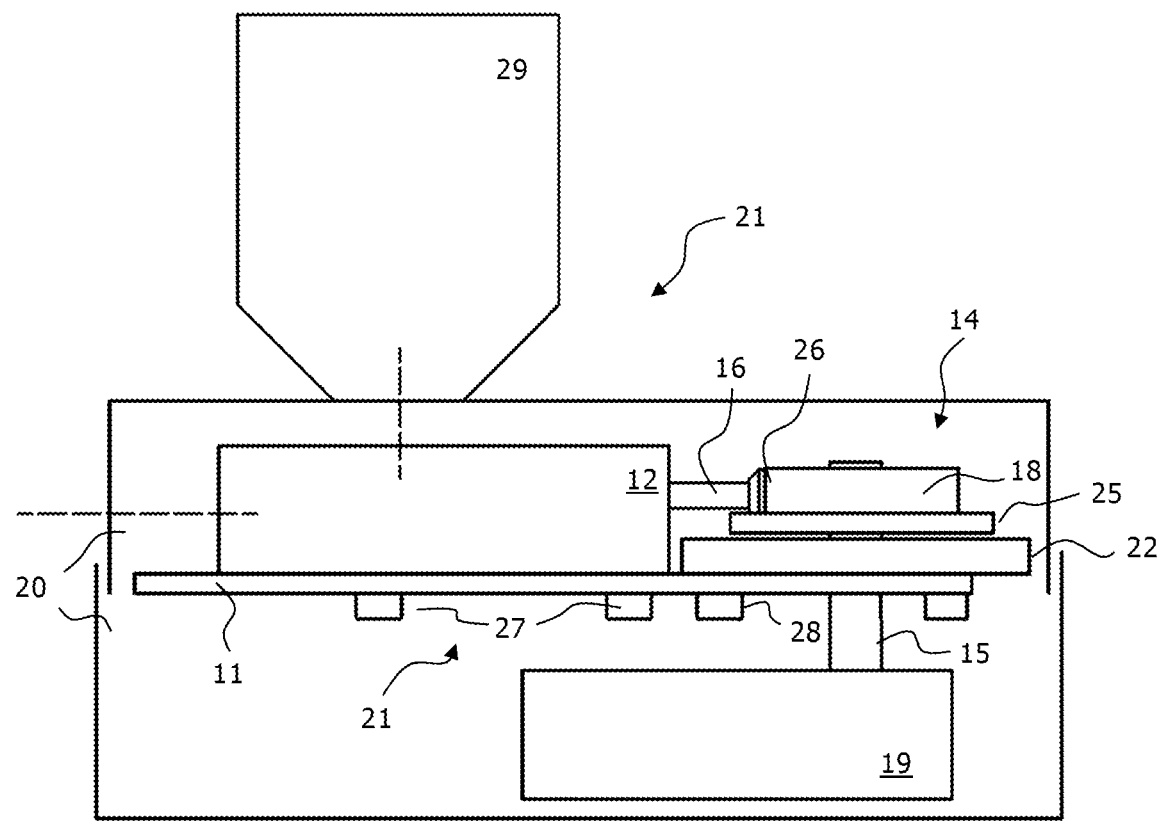
FIG. 4 is a schematic view of an embodiment of a lubricant pump according to the present disclosure.

FIG. 4 illustrates an embodiment of a lubricant pump according to the disclosure in a schematic representation. The assembly unit 21 of FIGS. 1 to 3 herein further also comprises a driving device 19 attached to the drive shaft 15 in a torque-locked manner. The assembly unit 21 comprising the driving device 19 is received in a pump housing 20 formed of two parts herein. Since the forces acting between the eccentric arrangement 14 and the pump element 13 are transmitted fully via the base plate 11, the pump housing 20 may, for example, be formed as a plastic housing. The pump element 13 accommodated in the pump element housing 12 obtains the lubricant to be delivered from a reservoir, which may herein be formed as a lubricant cartridge 29. In a preferred configuration, the lubricant cartridge 29 may be fitted onto the pump housing 20 from the outside, and a lubricant supply (not shown) may be attached from the lubricant cartridge 29 to the pump element housing 12.

Figure 5:
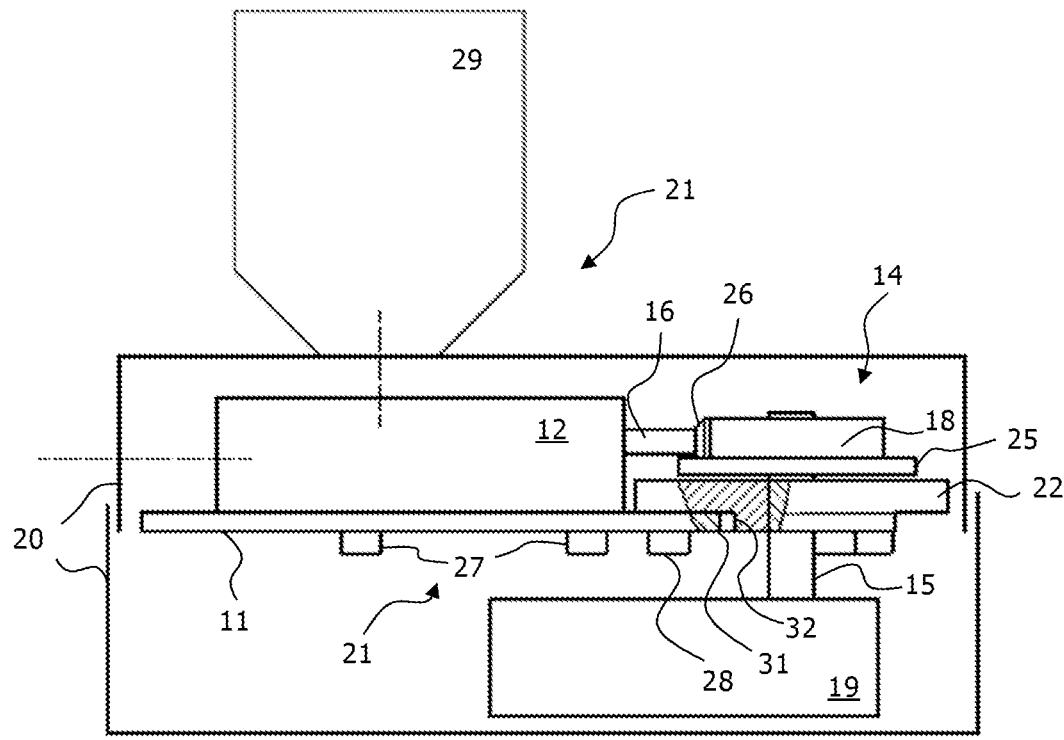
FIG. 5 is a schematic partial sectional view of a modified embodiment of an assembly unit according to the present disclosure in a principle representation.

FIG. 5 illustrates a modified embodiment of an assembly unit in a partial sectional view in a sketch representation. It becomes apparent herein that the assembly of the bearing washer 22 and the pump element housing 12 on the base plate 11 precisely secures the location of the structural parts in relation to each other. A positioner may be employed for assembly as such. Boreholes in the base plate 11 formed for inserting the fastening bolts 28 determine the relative position of the eccentric arrangement 14 to the pump element housing 12, wherein corresponding to the boreholes for the fastening bolts 28 in the base plate 11, respective internally threaded boreholes are provided in the bearing washer 22 of the eccentric arrangement 14. The bearing washer 22 may dip a projection into a respective recess, wherein radial clearance exists between the projection 32 of the bearing washer 22 and the recess 31 in the base plate 11.

The assembly concept described herein for a lubricant pump helps to create a lubricant pump that is easily adjustable regarding various requirements and highly versatile, in which the assembly effort is significantly reduced due to the combination of the most important components on an assembly unit 21. Moreover, the relevant forces acting between the eccentric arrangement 14 and the pump element 13 are absorbed immediately by the centrally disposed base plate 11, so that external structures, for example the pump housing 20, no longer need to ensure this force transmission function, further reducing the manufacturing effort and allowing more freedom regarding the formation and construction of the lubricant pump.

REFERENCE SIGNS LIST 11 base plate
12 pump element housing
13 pump element
14 eccentric arrangement
15 drive shaft
16 transmission means
17 eccentric fixing
18 eccentric
19 driving device
20 pump housing
21 assembly unit
22 bearing washer
23 eccentric body
24 undercut
25 eccentric washer
26 end-face portion
27 fastening bolt
28 fastening bolt
29 lubricant cartridge
30 lubricant pump
31 recess (base plate)
32 projection (base plate)

The invention claimed is:

1. An assembly unit as a structural component for a lubricant pump,
the assembly unit having a planar base plate, at least one pump element housing fixedly attached to the planar base plate with a pump element powered by a linear motion inserted therein, and further having an eccentric fixing to enable assembling an eccentric arrangement provided with a circumferential eccentric in a fixed relative position to the pump element inserted into the pump element housing, wherein the planar base plate extends parallel to a longitudinal extension of the pump element inserted into the pump housing and wherein a rotation axis of the circumferential eccentric of the eccentric arrangement is perpendicular to the planar base plate.

2. The assembly unit of claim 1, wherein the eccentric fixing comprises boreholes provided in a specified arrangement and formed to receive fastening bolts to enable securing the eccentric arrangement via respective internally threaded boreholes in the eccentric arrangement, in a predefined relative position to the pump housing.

3. The assembly unit of claim 2, wherein the eccentric fixing comprises boreholes provided in a specified arrangement and formed to receive fastening bolts to enable securing the eccentric arrangement via respective internally threaded boreholes in a bearing washer of the eccentric arrangement in a predefined relative position to the pump housing.

4. The assembly unit of claim 1, wherein the assembly unit also comprises the eccentric arrangement disposed in a fixed relative position to the pump housing.

5. The assembly unit of claim 1, wherein the planar base plate is formed from metal and has a thickness of between 1.5 mm and 10 mm.

6. The assembly unit of claim 1, wherein the planar base plate is formed from metal and formed to absorb the maximum compression force $F_{max}$ applied by the eccentric in pumping operation such that under the influence of this force $F_{max}$, a change in distance between a central axis of the eccentric arrangement and the pump element in a distal reversal point is less than 100 μm.

7. The assembly unit of claim 6, wherein the change in distance between the central axis of the eccentric arrangement and the pump element in a distal reversal point is less than 20 μm.

8. The assembly unit of claim 1, wherein the assembly unit further comprises a driving device connected to the planar base plate and coupled to the eccentric arrangement in a torque-locked manner.

9. The assembly unit of claim 1, wherein the planar base plate has a rectangular basic shape, wherein the longer side of the rectangular shape is parallel to a longitudinal extension of the pump element inserted into the pump housing.

10. A lubricant pump, comprising the assembly unit of claim 1 as well as the pump element housing with the assembly unit received therein.

11. The lubricant pump of claim 10, wherein the pump housing is fully or partially formed as a plastic housing.

12. A method of manufacturing an assembly unit as a structural unit for a lubricant pump according to claim 1, comprising the steps of:
providing a planar base plate with a pump element housing fastened thereto or previously integrally formed therewith, and fastening an eccentric arrangement in an eccentric fixing provided on the planar base plate and preferably formed as a borehole.

13. The assembly unit of claim 1, wherein the eccentric fixing is formed within the planar base plate as a borehole in which a drive shaft of the eccentric arrangement is rotationally supported.

* * * * *